US012358119B2

(12) United States Patent
Brinkmann et al.

(10) Patent No.: US 12,358,119 B2
(45) Date of Patent: Jul. 15, 2025

(54) HANDHELD PROCESSING TOOL HAVING A SUSPENSION MEANS

(71) Applicant: Robert Bosch GmbH, Stuttgart (DE)

(72) Inventors: Thomas Brinkmann, Aichtal-Groetzingen (DE); Joerg Kaiser, Markgroeningen (DE); Tobias Bayha, Walddorfhaeslach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/684,666

(22) PCT Filed: Jul. 8, 2022

(86) PCT No.: PCT/EP2022/069056
§ 371 (c)(1),
(2) Date: Feb. 17, 2024

(87) PCT Pub. No.: WO2023/020744
PCT Pub. Date: Feb. 23, 2023

(65) Prior Publication Data

US 2024/0383124 A1 Nov. 21, 2024

(30) Foreign Application Priority Data

Aug. 20, 2021 (DE) .................... 10 2021 209 180.6

(51) Int. Cl.
*B25F 5/00* (2006.01)
*B25F 5/02* (2006.01)

(52) U.S. Cl.
CPC .................................... *B25F 5/02* (2013.01)

(58) Field of Classification Search
CPC .................................... B25F 5/00; B25F 5/02
See application file for complete search history.

(56) References Cited

U.S. PATENT DOCUMENTS 8,087,556 B2 * 1/2012 Oomori .................... B25C 7/00 224/904
9,889,547 B2 2/2018 Marks
(Continued)

FOREIGN PATENT DOCUMENTS

DE 20 2013 004 302 U1 8/2013
DE 10 2020 107 189 A1 10/2020
(Continued)

OTHER PUBLICATIONS

International Search Report corresponding to PCT Application No. PCT/EP2022/069056, mailed Oct. 17, 2022 (German and English language document) (7 pages).

*Primary Examiner* — Eyamindae C Jallow
(74) *Attorney, Agent, or Firm* — Maginot, Moore & Beck LLP

(57) ABSTRACT

A handheld processing tool includes (i) a housing, (ii) at least one handle connected to the housing for guiding the processing tool, and (iii) a suspension mechanism configured to suspend the processing tool. The suspension mechanism is arranged, with an axial displacement region and a suspension region extending substantially transversely thereto, around at least part of a contour of the handle such that the suspension mechanism, in a first locking position, is inserted into the housing in a largely surface-neutral manner and, in at least one second locking position, is ejected out of the housing. The suspension region, in the at least one second locking position, can be rotated by at least one opening angle of at least 90° with respect to the first locking position in a tangentially locking manner.

12 Claims, 8 Drawing Sheets

(56) References Cited

U.S. PATENT DOCUMENTS

| | | | | |
|---|---|---|---|---|
| 10,286,539 | B2 * | 5/2019 | Francis | A61K 47/58 |
| 10,759,080 | B2 * | 9/2020 | Masatoshi | B25F 5/008 |
| 10,888,989 | B2 * | 1/2021 | Kawakami | B25F 5/02 |
| 11,559,879 | B2 * | 1/2023 | Machida | B25F 5/02 |
| 11,565,396 | B2 * | 1/2023 | Yoshikane | B25F 5/02 |
| 2009/0134191 | A1 | 5/2009 | Phillips | |
| 2015/0136434 | A1 | 5/2015 | Aoki et al. | |
| 2015/0266201 | A1 * | 9/2015 | Nakashima | B27B 9/02 30/374 |
| 2018/0207832 | A1 | 7/2018 | Masatoshi et al. | |
| 2019/0337142 | A1 | 11/2019 | Hays et al. | |
| 2020/0316766 | A1 | 10/2020 | Machida | |
| 2021/0001418 | A1 * | 1/2021 | Nakashima | B25F 5/02 |
| 2021/0107130 | A1 * | 4/2021 | Yoshikane | B25H 3/00 |
| 2021/0205977 | A1 * | 7/2021 | Machida | B25F 5/006 |

FOREIGN PATENT DOCUMENTS

| | | | |
|---|---|---|---|
| DE | 11 2019 003 879 | T5 | 4/2021 |
| EP | 2 022 607 | A2 | 2/2009 |
| EP | 3 030 390 | B1 | 6/2016 |
| EP | 3 658 336 | B1 | 6/2020 |
| JP | 2019-107711 | A | 7/2019 |
| WO | 2014/017113 | A1 | 1/2014 |
| WO | 2019/020456 | A1 | 1/2019 |
| WO | 2019/206762 | A1 | 10/2019 |

* cited by examiner

HANDHELD PROCESSING TOOL HAVING A SUSPENSION MEANS

This application is a 35 U.S.C. § 371 National Stage Application of PCT/EP2022/069056, filed on Jul. 8, 2022, which claims the benefit of priority to Serial No. DE 10 2021 209 180.6, filed on Aug. 20, 2021 in Germany, the disclosures of which are incorporated herein by reference in their entirety.

The disclosure relates to a handheld processing tool having a housing and having at least one handle connected to the housing, for guiding the processing tool, and having a suspension means for suspending the processing tool.

BACKGROUND

Working with handheld processing tools, in particular with handheld power tools, on ladders or scaffolding often presents operators with the challenge of safely putting down or hanging their processing tool when not in use. This is useful not only for easier handling, but also for the safety of people who move or stay under the ladder or scaffold.

DE 20 2013 004 302 U1 discloses a handheld power tool having a housing and having at least one storage unit for storing insertion tools, at least one suspension means, and at least one marking unit. The housing comprises at least one fastening means designed to interchangeably fasten the storage unit, the suspension means, or the marking unit to the housing using at least one fastening element.

Known from WO 19206762 A1 is an arrangement is known with a side handle for a handheld power tool and a suspension means, the suspension means comprising an eyelet portion configured to be connected to a safety belt. The side handle also comprises a clamping ring configured to attach the side handle to a round portion of the handheld power tool, whereby the suspension means is attached to the clamping ring.

EP 3 658 336 A1 discloses a machine tool having a suspension means for holding the machine tool. The suspension means comprises a hook having an insertion portion, whereby the insertion portion of the hook is insertable into a receiving portion of the suspension means. The suspension means further comprises a fastening portion for releasably fastening the suspension means to a housing of the machine tool, and a securing means for securing the suspension means to the housing. The receiving portion comprises an opening in the axial direction for receiving and rotatably mounting the insertion portion of the hook. The suspension means further comprises a first locking device, which interacts with the receiving portion and is coupled to the insertion portion in a rotationally fixed manner, for defining a rotational position of the hook relative to the suspension means. The first locking device comprises at least one spring arrangement and the receiving portion comprises at least one recess, whereby the at least one spring arrangement is configured to engage with the at least one recess in the receiving portion.

However, the known suspension means are all very strongly influenced by the suspension stability of the accessories (e.g., removable battery packs, suction modules, insertion tools, etc.) mounted on the handheld processing tool. Furthermore, these solutions often result in a significant increase in the outer contour of the processing tool, which in particular leads to an increase in the so-called corner dimension, an indicator that describes how far a drill hole can be drilled into a corner, particularly in the case of handheld drills, drill hammers or screwdrivers.

Therefore, the object of the disclosure is to increase the suspension safety of a handheld processing tool without significantly increasing its outer contour or geometry.

SUMMARY

According to the disclosure, it is provided that the suspension means is arranged, with an axial displacement region and a suspension region extending substantially transversely thereto, around at least part of a contour of the handle of the handheld processing tool such that the suspension means, in a first locking position, is inserted into the housing in a largely surface-neutral manner and, in at least one second locking position, is ejected out of the housing, whereby the suspension region, in the at least one second locking position, can be rotated by at least one opening angle of at least 90° with respect to the first locking position in a tangentially locking manner.

The surface-neutral storage option of the suspension in the first locking position means that any risk of injury to the operator from otherwise protruding parts can be avoided. In addition, there is a significantly reduced risk of damage to the processing tool or the suspension means in the event of an impact of the falling processing tool on the suspension means in particular. The suspension means is also better protected from external influences, such as impacts, accidental contact, etc., when the processing tool is in its first locking position during operation. As a result of the non-enlarged corner dimension, more convenient and flexible working with the handheld processing tool is possible. The arrangement of the suspension around a contour of the handle of the processing tool, in particular a main handle arranged at the rear end of the processing tool, makes it possible, in conjunction with the extension of the suspension means to the second locking position, to space a suspension point of the suspension means from a center of gravity of the processing tool such that the suspension safety is increased significantly and the suspension behavior is largely independent of the additional weight of any accessories used, such as one or more removable battery packs, an suction module, various insertion tools, etc.

The term “handheld processing tools” is understood to include battery-powered and/or grid-powered handheld power tools for processing parts by means of an electrically-powered insertion tool, such as a drill, a chisel, a grinding or polishing disc, a saw blade, a knife, or the like. Typical handheld power tools in this context include screwdrivers, impact drills, drill hammers, chisels, planers, angular grinders, oscillating sanders, polishing machines, or the like. However, a handheld processing tool is also to be understood as a measuring device, e.g. a rangefinder, a leveling device, a wall scanner, a spirit level, or the like. Handheld processing tools also include garden tools and construction equipment such as lawn trimmers, branch saws, tilling and trenching machines, blowers, or the like. In this case, the drive can be powered by an electric motor and an internal combustion engine. Furthermore, the disclosure is applicable to handheld household appliances, such as vacuum cleaners, mixers, etc.

The axial displacement region is understood to be the region of the suspension means that can be inserted in an axial direction, in particular in a main working direction of the handheld processing tool, into the housing of the processing tool for moving it into the first locking position and out of it for moving it into the second locking position. A suspension region extending substantially transverse to the axial displacement region is to be understood as the region of the suspension means that is used to suspend the processing tool, to which, e.g., a carrying strap or the like can be attached, or which can be suspended via a suitable protrusion or other holding element of a scaffold, a ladder, a wall, or the like. The term "substantially transverse" is intended to indicate that the suspension region can be arranged at an angle of approximately 60 to 120° to the displacement region. In addition, the suspension region itself can feature any shape, e.g. an arc, a triangle, a polygon, a meander, a zigzag path, or the like. Therefore, "substantially transverse" defines the path of the suspension region from its starting point at the adjacent displacement region to its end point, where a hook-shaped end adjoins the suspension region, which engages into a first undercut recess of the housing in the first locking position. A particular advantage of the hook-shaped end is that it provides a simple locking means for the first locking position on the one hand, which on the other hand also serves as an additional means of securing the suspension region in the second locking position.

In a further embodiment, the suspension means is lockable in a third locking position by the hook-shaped end engaging in a second undercut recess of the housing adjacent to the first undercut recess. As a result, it is possible to hang up or hold the processing tool by means of a loop, in particular a hand loop, a strap, or the like, without the need to substantially increase the outer contour of the handle. The suspension region, together with the displacement region and the hook-shaped end engaged in the third locking position, forms a closed strap which holds the loop securely in place.

In order to prevent severe damage to the processing tool or the slightly projecting suspension means in the event of an impact of the falling processing tool on the suspension means engaged in the third locking position, a bar between the first and the second undercut cut recess is designed to break in a specific manner. The bar arranged on the housing of the processing tool can be correspondingly thin or made of a softer material. A particular advantage is the replaceable bar. In this way, the processing tool can be further used even after a breakage of the bar without functional limitations.

The axial displacement region of the suspension means is guided in a resilient manner within a cylindrical guide bore in the housing. The guidance is in this case performed by a compression spring. This makes the suspension means very easy to operate with defined end states and/or locking positions.

By applying pressure to the suspension means, in particular to the suspension region, against the resilient force in conjunction with a slight tangential rotation of a few degrees, in particular by less than 10°, the hook-shaped end can be released by the operator from the undercut recess of the first or third locking position in order to move the suspension means to another locking position. In a further embodiment, the axial displacement region is formed from a cylindrical shaft, to the open end of which a sliding element is attached, which slides in a guide cylinder, whereby the compression spring is supported at one end of the guide cylinder and at the other end on the sliding element.

In one embodiment, it is also provided that the guide cylinder is formed by the guide bore of the housing and by a lateral retaining cover, which covers the guide bore over the axial displacement region of the suspension means within the housing. This makes it particularly easy to mount the suspension means in the housing of the processing tool. For this purpose, the axial displacement of the suspension means is guided through the guide bore of the housing or the handle in order to subsequently attach the sliding element to the open end of the axial displacement region. One end of the compression spring then pushes on the mounted sliding element. Finally, when mounting the side retaining cover, the free spring end is aligned on a spring cross at the end of the guide cylinder.

Furthermore, the sliding element and/or the cylindrical shaft features a locking geometry for tangentially locking the suspension means in the at least one second locking position. In this way, the suspension means can be utilized with different tangential extension positions of the suspension region, which enables optimum handling during suspension depending on the weight distribution and center of gravity of the processing tool.

In order to prevent accidental changes to the tangential opening position, in particular when the processing tool is suspended, the locking geometry is designed with a particular advantage such that self-locking is achieved by an axial force flow in the direction of the resilient force of the compression spring.

In the case of handheld processing tools provided with a removable battery pack, the suspension means is advantageously arranged between the handle and an electromechanical interface for the removable battery pack. The resulting high uniformity of the individual components makes it easier to transfer the suspension means according to the disclosure to processing tools with the same or similar arrangement or geometry of the handle and battery pack interface.

The voltage of a removable battery pack is typically a multiple of the voltage of a single energy store cell and results from the interconnection (parallel or in series) of the individual energy store cells. The energy storage cells are preferably designed as lithium-based energy storage cells, e.g., Li-ion, Li-po, Li-metal, or the like. However, removable battery packs with Ni—Cd, Ni-MH cells or other suitable cell types can also be used. For common Li-Ion energy storage cells with a cell voltage of 3.6 V, examples of voltage classes are 3.6 V, 7.2 V, 10.8 V, 14.4 V, 18 V, 36 V, etc. It should also be noted that the design of the electromechanical interfaces of a removable battery pack and the processing tool, as well as the associated receptacles for frictional and/or interlocking releasable connection, are not intended to be the subject matter of this disclosure. A skilled person will select a suitable embodiment for the battery pack interface depending on the power or voltage class of the processing tool and/or the removable battery pack. The embodiments shown in the drawings are therefore only to be understood by way of example.

BRIEF DESCRIPTION OF THE DRAWINGS

The disclosure is explained hereinafter with reference to FIGS. 1 through 8 by way of example, whereby identical reference characters in the drawings indicate identical components having an identical function.

Shown are.

DETAILED DESCRIPTION

Figure 1:
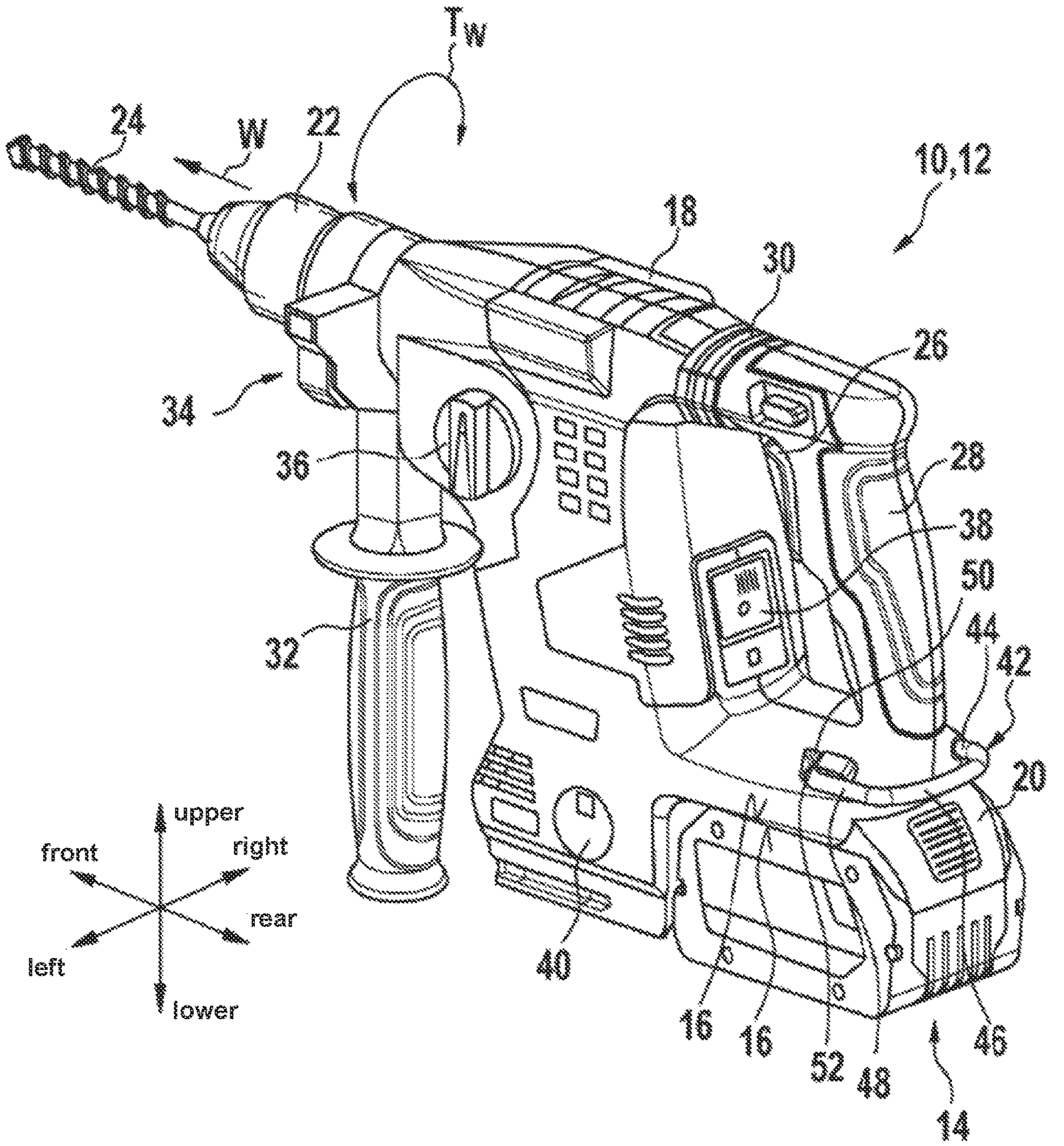
FIG. 1: a perspective view of a processing tool designed as a hammer drill having a suspension means in a first exemplary embodiment.

FIG. 1 shows a handheld processing tool 12 designed as a drill hammer 10 that is powered by a removable battery pack 14. The removable battery pack 14 can be releasably connected to the drill hammer 10 via correspondingly designed electromechanical interfaces 16 on the removable battery pack 14 or on a housing 18 of the drill hammer 10 in a frictional and/or interlocking manner. For this purpose, an operator can insert and lock the removable battery pack 14 along with its electromechanical interface 16 into the electromechanical counter-interface 16 of the drill hammer 10. It should be noted that the overall design of the electromechanical interfaces 16 of the removable battery pack 14 and the processing tool 12 that can be connected thereto, as well as the associated receptacles for the frictional and/or interlocking connection are not intended to be the subject of this disclosure. A skilled person will select a suitable embodiment for the interfaces 16 depending on the power or voltage class of the processing tool 12 and/or the removable battery pack 14.

The removable battery pack 14 is substantially a conventional removable battery pack 14 with a housing 20, which, on a first side wall or its top side, comprises the first electromechanical interface 16 for releasable connection to the electromechanical counter-interface 16 of the drill hammer 10. The removable battery pack 14 is discharged during operation of the drill hammer 10. As previously mentioned hereinabove, the battery voltage of the removable battery pack 14 generally results from a multiple of the individual voltages of the energy store cells (not shown) as a function of their connection (in parallel or in series). Preferably, the energy store cells are designed as lithium-based battery cells, e.g., Li-ion, Li-po, Li-metal, or the like. However, a removable battery pack with Ni—Cd, Ni-MH cells or other suitable cell types is conceivable. The disclosure can also be applied without limitation to a drill hammer 10 operated at grid voltage, e.g. 230 VAC.

The drill hammer 10 comprises a striking mechanism (not shown in greater detail) for driving an insertion tool 24, e.g. a drill bit or a chisel. which can be alternately held in a drill chuck 22. The striking mechanism is driven by an electric motor arranged in a housing 24 with a downstream transmission, which is supplied with energy by power electronics. The power electronics are controlled via a control unit or regulating unit integrated in the drill hammer 10 for regulating or controlling the electric motor, e.g. as a function of a main switch 26 that can be actuated by an operator. The main switch 26 is arranged in a main handle 28 of the drill hammer 10. In a known manner, the main handle 28 is coupled to the housing 18 in a vibration-damped manner by a damping device 30 to protect the operator from excessive vibration during prolonged work operations. The same applies to an additional handle 32 arranged in the vicinity of the drill chuck 22. The operator can rotate this in a tangential direction $T_W$, relative to a main working direction W of the drill hammer 10 via a tensioning and clamping device 34 and thus adjust it according to their needs. It is also possible to completely remove the additional handle 32.

By means way of an operating mode switch 36 located in the housing 18, the operator can switch between different operating modes, such as a drilling mode, a hammer drilling mode, or a chiseling or hammering mode. The operator can also use the main switch 26 to vary the rotational speed and/or torque of the electric motor, and thus of the insertion tool 24 or drill chuck 22, which is operatively connected via the striking mechanism. A Human Machine Interface (HMI) 38 provides the operator with a wide range of information about e.g., the charge state of the connected removable battery pack 14, about the set operating mode as well as about any operating faults, e.g. an excessive temperature or the like. Furthermore, the drill hammer 10 comprises an exchangeable communication module 40 for exchanging data with an external device (not shown in detail in this case), e.g. a smartphone, a smart watch, a personal computer, a gateway, a cloud server, or the like. The communication module 40 can also be used to make various settings on the hammer drill 10, e.g. activating or deactivating a kickback control mode or adaptive speed control from the external device. For this purpose, the communication module 40 exchanges the data via radio, in particular WLAN, Bluetooth, LoRa, Zeegbee, or a comparable data protocol. A further detailed description of the processing tool 12 designed as a drill hammer 10 is omitted in this case, as this is only of minor importance regarding the disclosure, and the drill hammer 10 is also only to be understood by way of example of various handheld processing tools 12.

Between the main handle 28 and the electromechanical battery interface 16 arranged below the main handle 28, the drill hammer 10 comprises a suspension means 42 at its rear end. The suspension means 42 can be functionally divided into an axial displacement region 44, a suspension region 46 extending substantially transverse thereto and a hook-shaped end 48 adjacent to the suspension region 46. The axial displacement region 44 and the suspension region 46 are arranged around at least one contour of the main handle 28 such that the suspension means 42, in a first locking position 50, is inserted into the housing 18 of the drill hammer 10 in a largely surface-neutral manner. The hook-shaped end 48 in the first locking position 50 engages with a first undercut recess 52 of the housing 18. The first undercut recess 52 is designed such that the hook-shaped end 48 for releasing the first locking position 50 is rotated tangentially around the axial displacement region 44 at a relatively small angle, preferably below 10°. Given that, on the one hand, the displacement region 44 is arranged on the right side of the housing 18 or the suspension means 42 when viewed from the rear and the hook-shaped end 48 is arranged on the left side of the housing 18 or the suspension means 42 and, on the other hand, the undercut recess 52 is open towards the top, a tangential clockwise rotation is required to release the suspension means 42 from the first locking position 50. However, this may vary depending on the arrangement and configuration of the suspension means 42 and the undercut recess 52.

Figure 2A:
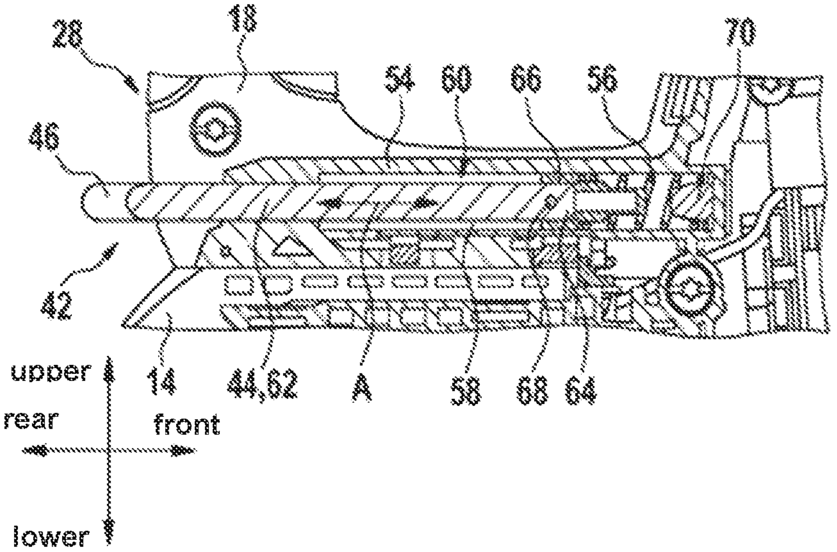
FIG. 2: two sectional drawings through the suspension means according to FIG. 1 in a side view (FIG. 2*a*) and a top view (FIG. 2*b*) as well as a perspective detail view of the suspension means (FIG. 2*c*)
Figure 2B:
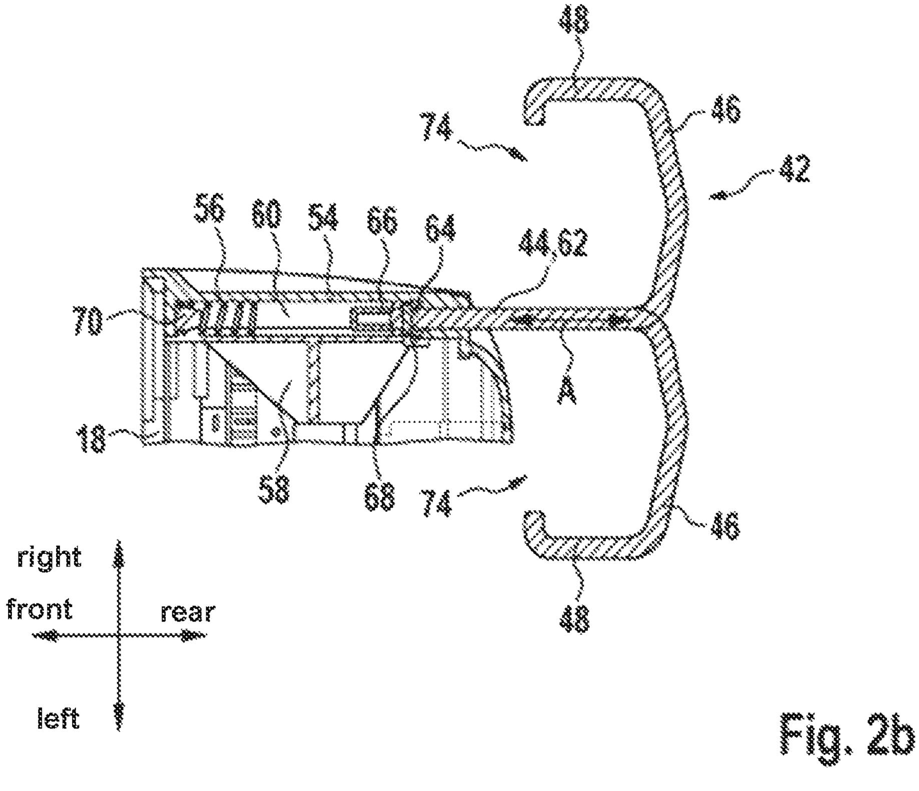
Figure 2C:
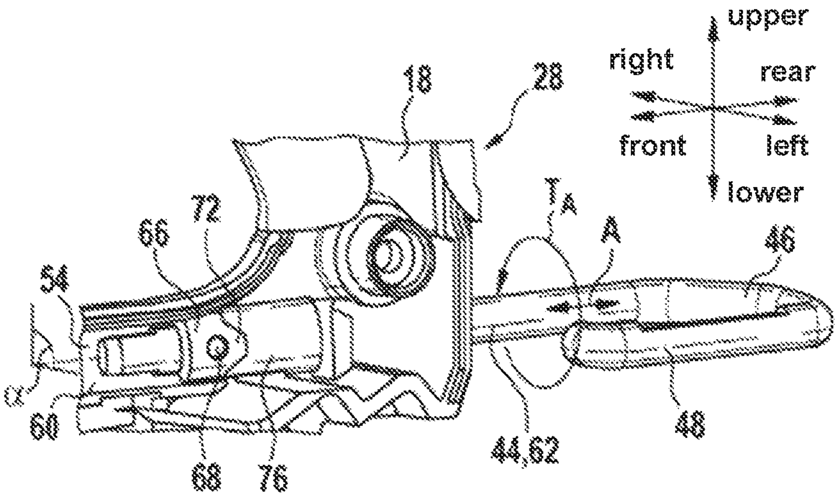
Figure 3A:
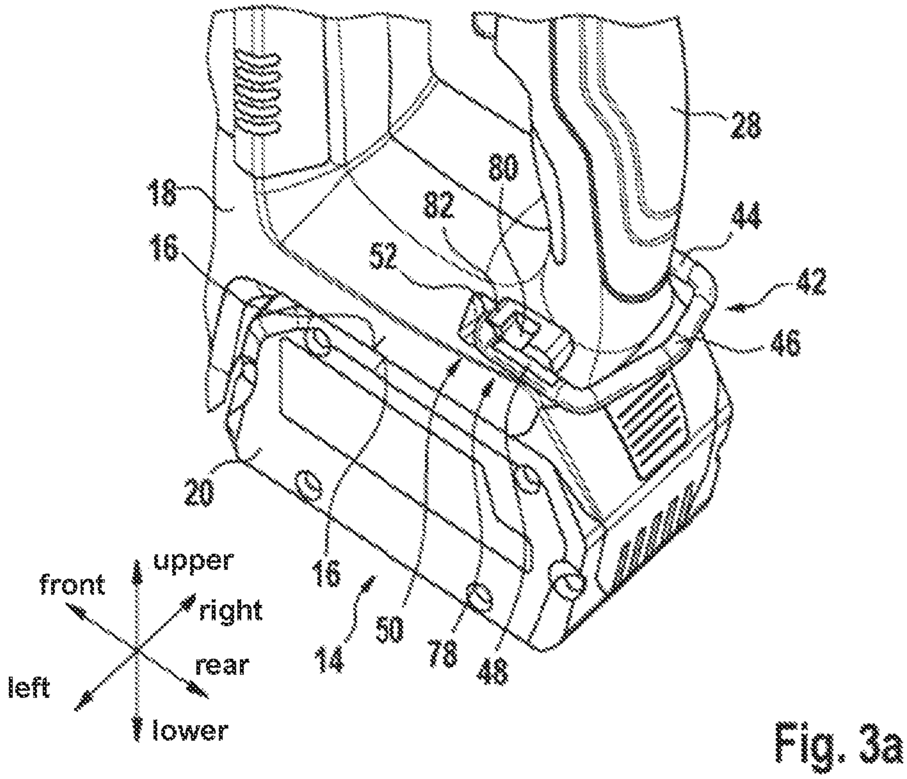
FIG. 3: a second exemplary embodiment of the suspension means in two perspective views (FIGS. 3*a*, 3*b*)

For better orientation, coordinate crosses with the designations “rear”, “front”, “bottom”, “top”, “left” and “right” are shown in FIGS. 1 to 3. These designations refer primarily to the main working direction W, and thus to the holding of the drill hammer 10 by an operator, in particular during a machining operation. However, the designations are not to be understood as limiting the disclosure, since the suspension means 42 can also be arranged differently in the respective housing in other processing tools 12. In the drill hammer 10 shown, the suspension means 42 could, e.g., also be rotated by 90° relative to the main working direction W such that the displacement region 44 extends from left to right instead of from the rear to front.

FIG. 2 shows a section through the axial displacement region 44 of the suspension means 42. According to FIG. 2*a*, this is guided in a resilient manner within a cylindrical guide bore 54 of the housing 18 by a compression spring 56, whereby the resilient guidance is such that the compression spring 56 makes it easy to operate the suspension means 42 with defined end states and/or locking positions. According to FIG. 2*b*, a guide cylinder 60 is formed by the guide bore 54 of the housing 18 and by a lateral retaining cover 58, which covers the guide bore 54 over the axial displacement region 44 of the suspension means 42 within the housing 18, in which the displacement region 44 of the suspension means 42 is axially displaceably mounted. The axial displacement region 44 is formed from a cylindrical shaft 62, to the open end 64 of which a sliding element 66 is attached, which slides in the axial direction A in the guide cylinder 60. The sliding element 66 can, e.g., be screwed onto the shaft 62 or secured by means of a cotter pin 68. The compression spring 56 is supported on one end of the guide cylinder 60, in particular on a spring cross 68 of the retaining cover 58, and on the other end on the sliding element 66. This enables particularly easy assembly of the suspension means 42 in the housing 18 of the drill hammer 10. For this purpose, the axial displacement region 44 or the shaft 62 of the suspension means 42 is guided through the guide bore 54 of the housing 18 or the main handle 28, in order to subsequently attach the sliding element 66 to the open end 64 of the axial displacement region 44 or the shaft 62. One end of the compression spring 56 is then attached to the mounted sliding element 66. Finally, when mounting the side retaining cover 58, the free spring end of the compression spring 56 is aligned on the spring cross 68 at the end of the guide cylinder 60. Preferably, the displacement region 44, the suspension region 46, and the book-shaped end 48 of the suspension means 42 are manufactured in one piece from metal, in particular steel, whereas the sliding element 66 and the retaining cover 58 with the spring cross 68 consist of plastic. However, other material combinations are also conceivable.

By applying pressure to the suspension means 42, in particular to the suspension region 44, against the resilient force of the compression spring 56 in the axial direction A in conjunction with a slight tangential rotation of a few degrees, in particular by less than 10°, in direction $T_A$ (see FIG. 2C), the hook-shaped end 48 can be released by the operator from the undercut recess 52 of the first locking position 50 in order to move the suspension means 42 to another locking position (see FIG. 2*b*). For this purpose, the sliding element 66 according to FIG. 2*c* features a locking geometry 72 for tangentially locking the suspension means 42 in at least one second locking position 74, whereby the locking geometry 72 is designed as a crown, which interacts with a corresponding counter-geometry 76 at the open end of the guide bore 54 of the housing 18 such that the suspension region 46 of the suspension means 42, in the second locking position 74, can be rotated by at least one opening angle α of at least 90° with respect to the first locking position 50 in a tangentially locking manner. FIGS. 2*b* and 2*c* show, e.g., two second locking positions 74, whereby one of the two second locking positions 74 are rotated tangentially in the direction of $T_A$ by α=180° compared to the first locking position 50. In contrast, in the other second locking position 74, the suspension means 42 features the same tangential orientation as in the first locking position 50. In other words, the suspension means 42 is fully extended in the axial direction A with an opening angle α=0°. The locking geometries 72 and 76 comprise projections designed as crown teeth, each with beveled flanks at a tangential distance of 180°, which engage into correspondingly designed complementary recesses such that, in the suspended state of the drill hammer 10, accidental adjustment in tangential direction $T_A$ is no longer possible due to the resulting axial force flow in the direction of the compression spring 56. In this way, the suspension means 42 can be utilized with various tangential extension positions α of the suspension region 46, which enables optimum handling when suspended on scaffolds, ladders, or other suitable protrusions, depending on the weight distribution and center of mass of the drill hammer 10 and the accessories used therein, in particular the removable battery pack 14, the insertion tool 24, or a dust extraction (not shown).

FIG. 3 shows a further exemplary embodiment of the suspension means 42 for the drill hammer 10 in a perspective view. The axial displacement region 44, the suspension region 46 and the hook-shaped end 48 of the suspension means 42 are not different from the first exemplary embodiment shown in FIGS. 1 and 2. In contrast to the first exemplary embodiment, however, the suspension means 42 can then be locked in a third locking position 78 by the hook-shaped end 48 engaging into a second undercut recess 80 of the housing 18 adjacent to the first undercut recess 52, whereby a bar 82 is arranged between the two undercut recesses 52, 80. This bar is designed such that it can break in a specific manner in the event of an impact of the drill hammer 10 on the suspension means 42, which is locked in the third locking position 78. The bar 82 arranged on the housing 18 of the drill hammer 10 can be correspondingly thin or made of a softer material. A particular advantage is the replaceable bar 82. In this way, the suspension means 42 of the drill hammer 10 can also be further used after a breakage of the bar 82 without functional limitations.

Figure 3B:
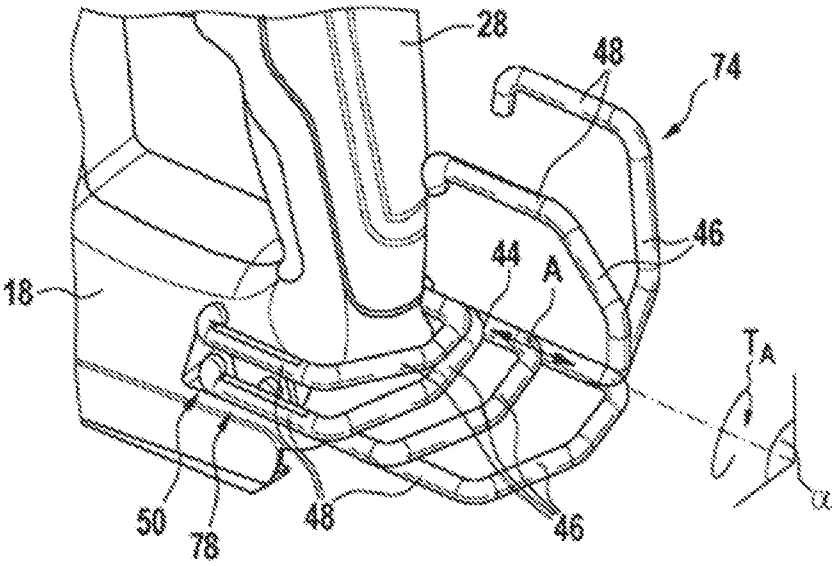
Figure 4A:
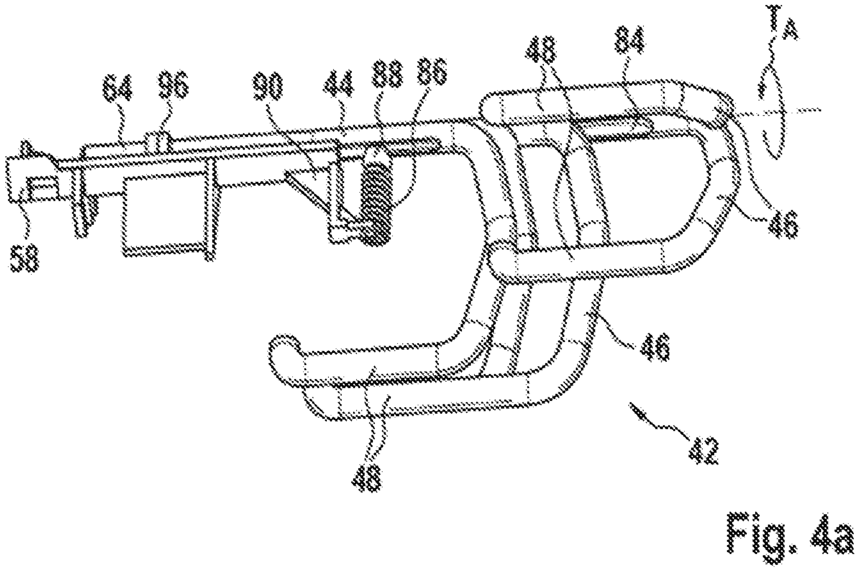
FIG. 4: a third exemplary embodiment of the suspension means in four perspective detail views (FIGS. 4*a*, 4*b*, 4*c*, 4*d*)
Figure 4B:
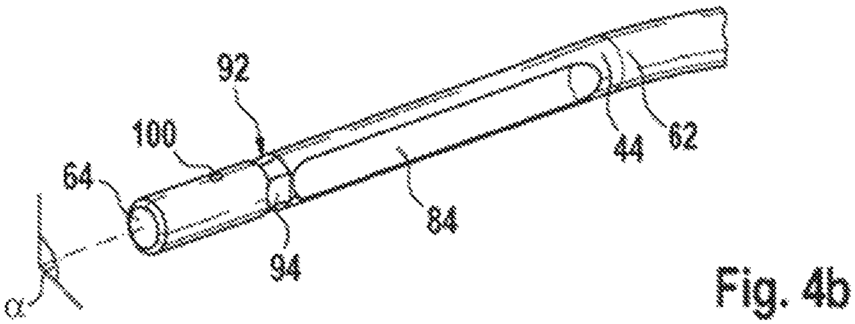
Figure 4C:
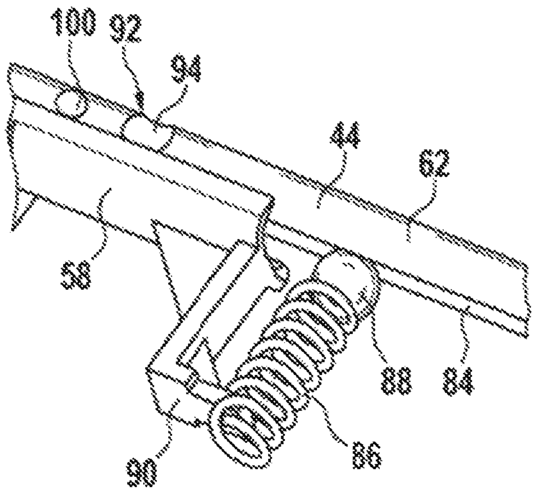
Figure 4D:
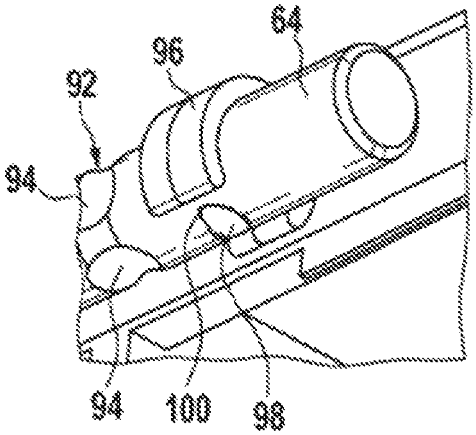

FIG. 3*b* illustrates the three different locking positions 50, 74, 78 as well as the procedure for adjusting them by the operator. For this purpose, the suspension means 42 according to FIG. 2*b* is shown superimposed in multiple positions. As previously mentioned with respect to FIG. 1, the hook-shaped end 48 engages into the first locking position 50 in the first undercut recess 50 of the housing 18 such that the suspension means 42 is inserted into the main handle 28 or into the housing 18 of the drill hammer 10 in a largely surface-neutral manner without substantially changing the contour of the housing 18 or main handle 28. The resilient force of the compression spring 56 prevents an automatic release of the suspension means 42, as it pushes the hook-shaped end 48 against a slightly inclined flank of the first undercut recess 50 or against the correspondingly extending bar 82 between the first and the second undercut recess 52, 80. If the operator then pushes against the resilient force of the compression spring 56 from behind on the suspension region 46 of the suspension means 42, the suspension means 42 is indented forwards a short distance in the axial direction A forward, so that it can then be rotated clockwise upwards in the tangential direction $T_A$. A small angle, in particular of less than 10°, is sufficient to release the hook-shaped end 48 from the first locking position 50 and to be able to displace the suspension means 42 backwards in the axial direction A. The resilient force of the compression spring 56 is sufficient to lock the hook-shaped end 48 of the suspension means 42 in the third locking position 78 by inserting it into the second undercut recess 80, similar to the first locking position 50. As a result, a strap or the like (not shown) can be threaded into the resulting eyelet to suspend the drill hammer 10 thereon. The third locking position 78 is released in the same way as the release from the first locking position 50, so this is will not be addressed again. When the suspension means 42 is released from the first or third locking positions 50 or 78, it can be fully extended in the axial direction A and freely rotated in the tangential direction $T_A$ to move it to the second locking position 74. In this case, the two correspondingly interacting locking geometries 72 and 76 of the sliding body 66 or the housing 18 enable a tangential locking in the direction of $T_A$ with different opening angles α of e.g. 0°, 90°, 180° and 270°. Opening angles α deviating from this are also conceivable depending on the locking geometries 72, 76, although the suspension means 42 can always be rotated in the second locking position 74 by at least one α 90° opening angle compared to the first and the third locking position 50, 78. An axial force flow in the direction of the resilient force of the compression spring 56 in conjunction with the two locking geometries 72, 76 thus results in a self-locking of the suspension means 42 in the second locking position 74. Alternatively or additionally, this self-locking may result from a pulling force acting on the suspension region 46 when the drill hammer is suspended.

FIG. 4 shows a further embodiment of the suspension means 42. FIGS. 4*b* to 4*c* show further details from FIG. 4*a*. Unlike the previous exemplary embodiments, the locking geometry 72, 76 is then no longer achieved by an additional sliding body and the housing 18 of the drill hammer. Instead, the shaft 62 of the axial displacement region 44 is directly provided with an axially extending groove 84, which supports axial displacement of the suspension means 42 with a tangential angle of 0° and which thus serves as additional locking in the first and third locking positions 54 and 78, respectively. For this purpose, a ball 88 subjected to the compressive force of a compression spring 86 is guided in the groove 84, which is disengaged from the groove 84 against the resilient force when the suspension means 42 is tangentially rotated in the tangential direction $T_A$. The compression spring 86 is held by a correspondingly designed protrusion 90 of the retaining cover 58. The spring can also be connected to the protrusion in a bonded manner. It is also conceivable that the retaining cover 58 and the compression spring 86 are designed to be integral and, e.g., made of plastic or metal. The ball 88 can be made of metal, plastic, ceramic, or the like.

In the vicinity of the open end 64 of the shank 62, a tangentially extending groove 92 is provided, which on the one hand serves for axial locking in the second locking position 74 and on the other hand also enables tangential locking with different opening angles α. For this purpose, the tangential groove 92 comprises various cup-shaped hollows 94 at the tangential angular distance of the locking opening angles α, in which the ball 88 comes to rest in a locking manner due to the resilient force of the compression spring 86.

In order to prevent the suspension means 42 from being pulled out of the guide bore 54 of the housing 18, it comprises a retaining ring 96 at the open end 64 of the shaft 62, which at the same time also serves as a support for the compression spring 56 (not shown in this case), in particular in the first and third locking positions 50 and 78. The retaining ring 96 can be designed as a snap ring having a guide pin 98, whereby the guide pin 98 prevents axial displacement of the retaining ring 96 by engaging through a corresponding bore 100 of the shaft 62.

Figure 5:
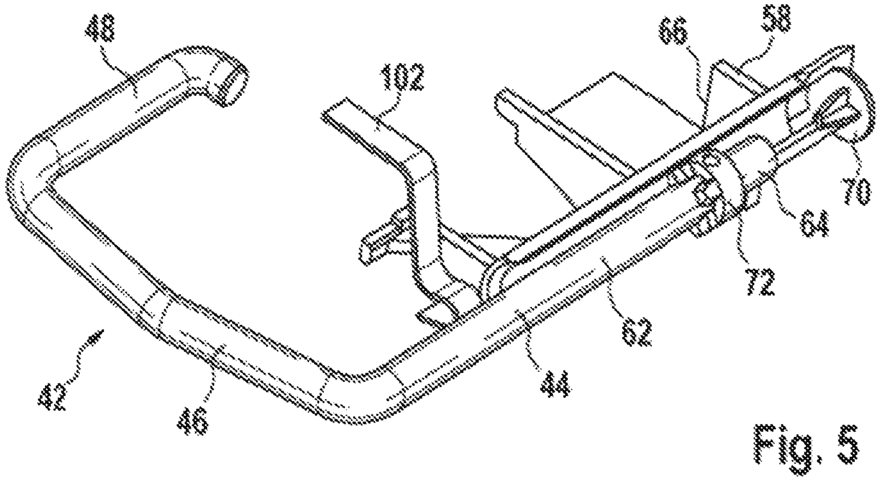
FIG. 5: a fourth exemplary embodiment of the suspension means in a perspective detail view.

FIG. 5 shows a further alternative of the suspension means 42, which differs substantially from the embodiment according to FIG. 2 in that the locking geometry 72 of the sliding element 66 designed as a crown interacts with a spring bracket 102 fixed in the housing 18 of the drill hammer 10. The suspension region 46 of the suspension means 42 can in this case also be tangentially rotated in the second locking position 74 by at least on opening angle α of at least 90° compared to the first and third locking position 50, 78 when the suspension means 42 is fully extended. Likewise, it is advantageous for ease of operation if the flanks of the crown teeth are slightly beveled such that the spring bracket 102 can be brought more easily into and out of engagement with the crown teeth when the suspension means 42 is rotated. In contrast to the exemplary embodiment shown in FIG. 2, the locking geometry is not self-locking, so that the suspension means 42 can still be adjusted in the tangential direction $T_A$ even when the drill hammer 10 is suspended, despite the resulting axial force flow in the direction of the resilient force of the compression spring 56, which is supported on the sliding element 66 and the spring cross 70 of the retaining cover 58 (not shown).

Figure 6A:
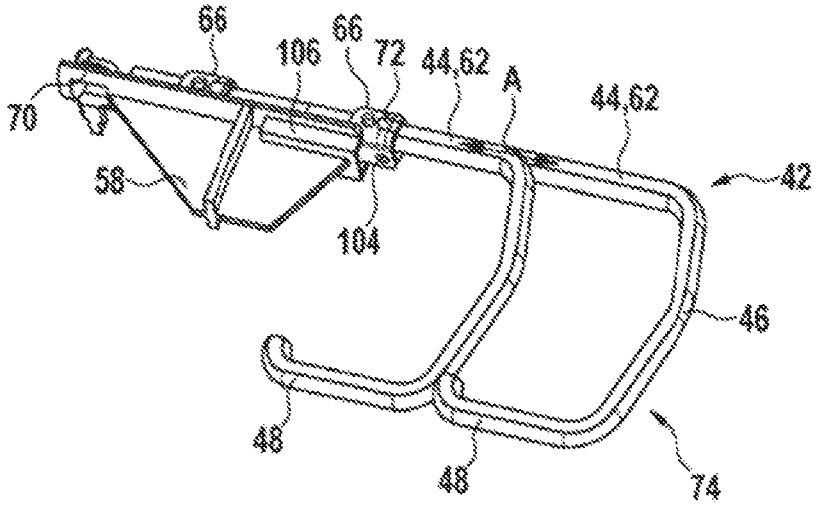
FIG. 6: a fifth exemplary embodiment of the suspension means in three perspective detail views (FIGS. 6*a*, 6*b*, 6*c*)
Figure 6B:
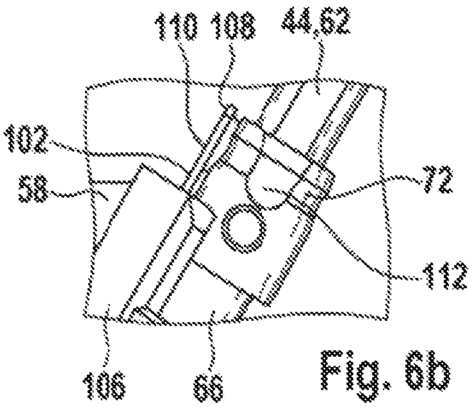
Figure 6C:
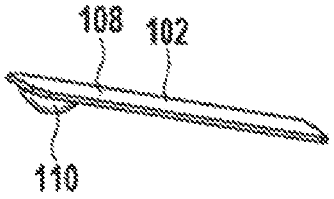

FIG. 6 shows a fifth exemplary embodiment of the suspension means 42. An essential difference to the previous exemplary embodiment is that a leaf spring 104 is received directly in a receiving groove 106 of the retaining cover 58 and extends in the axial direction A of the displacement region 44 of the suspension means 42. A hemispherical protrusion 110 is provided at an open end 108 of the leaf spring 104, which interacts with a corresponding locking geometry 72 of the sliding element 66 in the extended state of the suspension means 42. For this purpose, the locking geometry 72 comprises cup-shaped hollows 112 similar to the tangentially extending groove 92 shown in FIG. 4, into which the hemispherical protrusion 108 engages in a tangentially locking manner in the second locking position 74 of the suspension means 42 with an opening angle α of 0°, 90°, 180°, and 270°. The resilient effect of the leaf spring 104 is achieved by the fact that it is only partially inserted into the axial receiving groove 106 under a preload acting on the locking geometry 72. Similar to the exemplary embodiment according to FIG. 5, the locking geometry 72 also features no self-locking in this case.

Figure 7A:
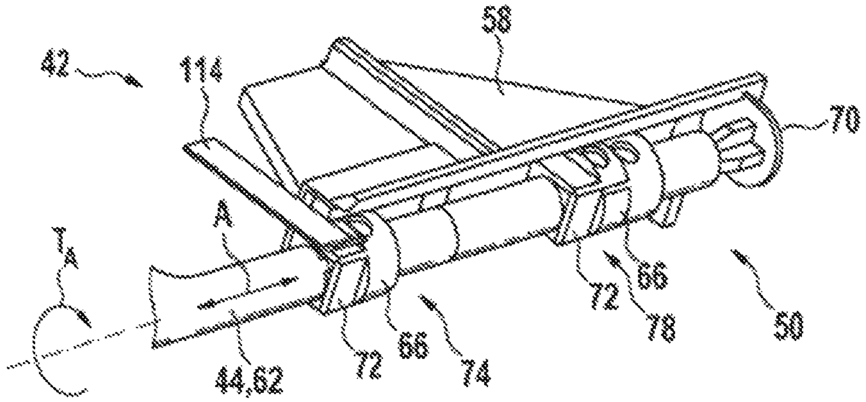
FIG. 7: a sixth exemplary embodiment of the suspension means in two perspective detail views (FIGS. 7*a*, 7*b*)
Figure 7B:
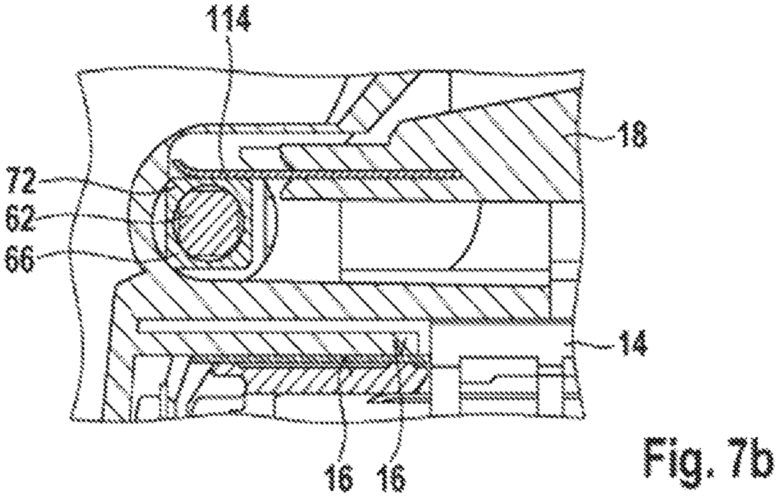
Figure 8A:
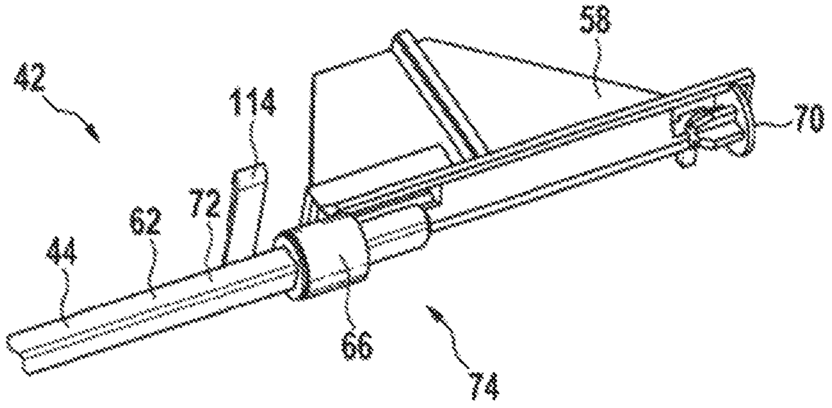
FIG. 8: a seventh exemplary embodiment of the suspension means in two perspective detail views (FIGS. 8*a*, 8*b*).
Figure 8B:
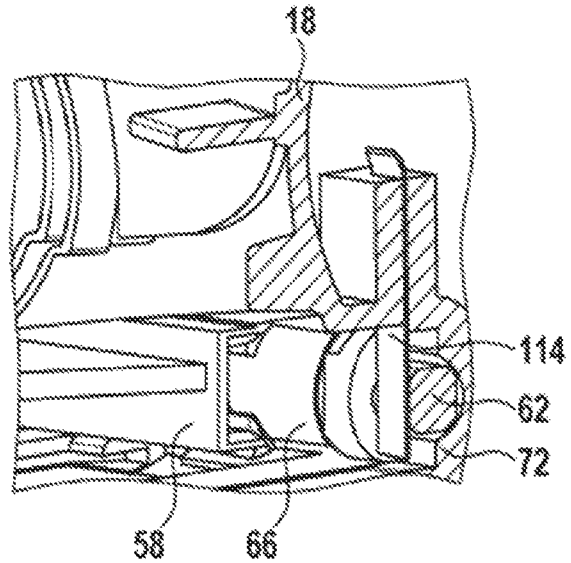

FIGS. 7 and 8 show two further exemplary embodiments of the suspension means 42, in each case with a leaf spring 114 acting on a locking geometry 72 designed as a square. In FIG. 7, the square is part of the sliding element 66, while in FIG. 8 it is formed directly by the shaft 62 over the axial length of the displacement region 44. The retaining cover 58 including the spring cross 70 for supporting the compression spring 56 and the leaf spring 114 are identical in both exemplary embodiments.

In contrast to the previous exemplary embodiment, the leaf spring 114 is no longer fixed in the retaining cover 18, but directly in the housing 18 of the drill hammer 10 without preload. In addition, it is not arranged in the axial direction A, but transversely thereto; in the exemplary embodiment shown in FIG. 7, parallel to the battery interface 16 (see FIG. 7*b*), in the exemplary embodiment shown in FIG. 8, perpendicular to the battery interface 16. However, other fixations in the housing 18 deviating from this are also conceivable. The leaf spring 114 can feature a different structure, in particular in the fixing region of the housing 18 in order to ensure a better retention in the housing 18. It is also conceivable to design the leaf spring 114 to be integral with the housing 18.

As in the previous exemplary embodiments, the suspension means 42 is also released in the exemplary embodiments shown in FIGS. 7 and 8 by a slight engagement in the axial direction A against the resilient force of the compression spring 56 and a slight tangential rotation in the direction $T_A$ from the first or third locking position 50 or 78 in order to axially move it in the direction of the resilient force of the compression spring 56 to the second locking position 74 (in FIG. 7*a*, the three locking positions 50, 74, 78 are indicated by the three axial positions of the sliding element 66; in FIG. 8*a*, only the second locking position 74 of the suspension means 42 is shown).

The leaf spring 114 then acts on the locking geometry 72 of the sliding element 66 or the shaft 62, which is designed as a square such that the suspension means 42 locks tangentially at an opening angle α of 0°, 90°, 180° and 270° in the second locking position 74 when rotated in the direction of $T_A$. Similar to the exemplary embodiment shown in FIGS. 5 to 6, the locking geometry 72 in this case also features no self-locking as a result of the pulling force acting on the suspension region 46 when the drill hammer 10 is suspended. It should also be noted that the suspension means 42 can be rotated beyond a full circle in all exemplary embodiments. However, it can also be provided that the suspension means 42 comprises a tangential stop at the largest opening angle (e.g., 270°) so that it cannot be rotated further.

Finally, it should be noted that the exemplary embodiment shown is not limited to FIGS. 1 to 8, nor to the embodiments of the drill hammer 10 and the removable battery pack 13. As mentioned hereinabove, the disclosure can be used for very different handheld processing tools 12, some of which have different housings. Nor is the disclosure limited to battery-powered processing tools 12. It can instead also be applied to grid-powered or fully unpowered handheld processing tools 12 without limitations.

The invention claimed is:

1. A handheld processing tool, comprising:

a housing;

at least one handle connected to the housing and configured to guide the processing tool; and a suspension mechanism configured to suspend the processing tool, wherein the suspension mechanism includes an axial displacement region and a suspension region extending substantially transversely thereto, wherein the suspension mechanism is arranged around at least part of a contour of the handle such that the suspension mechanism (i) in a first locking position, is inserted into the housing in a largely surface-neutral manner, and (ii) in at least one second locking position, is ejected out of the housing, and wherein the suspension region, in the at least one second locking position, is configured to be rotated by at least one opening angle of at least 90° with respect to the first locking position in a tangentially locking manner.

2. The handheld processing tool according to claim 1, wherein the suspension region of the suspension mechanism comprises a hook-shaped end that engages into a first undercut recess of the housing in the first locking position.

3. The handheld processing tool according to claim 2, wherein the suspension mechanism is configured to be locked in a third locking position by the hook-shaped end engaging into a second rear-cut recess of the housing adjacent to the first undercut recess.

4. The handheld processing tool according to claim 3, further comprising a bar located between the first and the second undercut recess, and wherein the bar is designed to break in a specific manner in the event of an impact of the handheld processing tool on the suspension mechanism locked in the third locking position.

5. The handheld processing tool according to claim 1, wherein the axial displacement region of the suspension mechanism is guided in a resilient manner within a cylindrical guide bore of the housing.

6. The handheld processing tool according to claim 5, further comprising a compression spring configured to resiliently guide the axial displacement region.

7. The handheld processing tool according to claim 6, wherein:

the axial displacement region is formed from a cylindrical shaft, to the open end of which a sliding element is attached, the sliding element is configured to slide in a guide cylinder, and the compression spring is supported on one side at one end of the guide cylinder and on the other side on the sliding element.

8. The handheld processing tool according to claim 7, wherein the guide cylinder is formed by the guide bore of the housing and by a lateral retaining cover that covers the guide bore over the axial displacement region of the suspension mechanism within the housing.

9. The handheld processing tool according to claim 7, wherein at least one of the sliding element and the cylindrical shaft includes a locking geometry configured to tangentially lock the suspension mechanism in the at least one second locking position.

10. The handheld processing tool according to claim 9, wherein the locking geometry is designed such that self-locking is achieved by an axial force flow in the direction of resilient force of the compression spring.

11. The handheld processing tool according to claim 1, wherein the suspension mechanism is arranged between the handle and an electromechanical interface for a removable battery pack.

12. The handheld processing tool according to claim 1, wherein the suspension mechanism is configured to be pushed against the resilient force of the compression spring in order to release from the first or the third locking position and subsequently tangentially rotated at an angle of at least 10° from the first or second undercut recess.

* * * * *